March 7, 1967  F. BÖTTGER ET AL  3,307,438
MACHINE TOOL
Filed Feb. 17, 1965  2 Sheets-Sheet 1
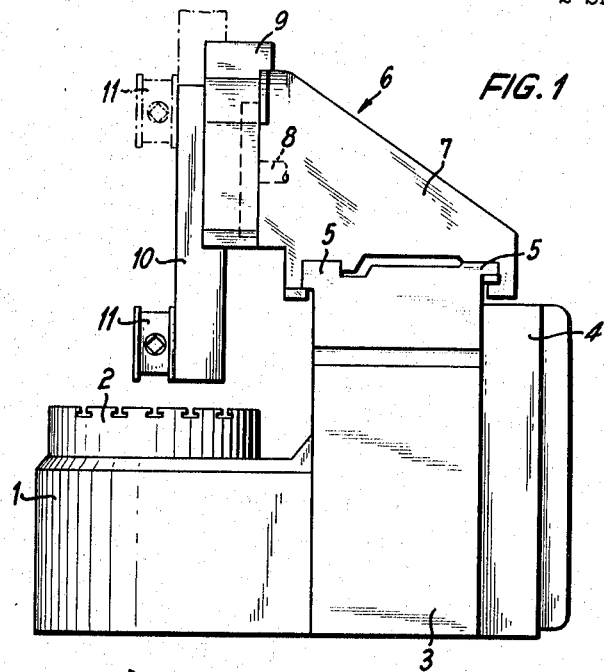
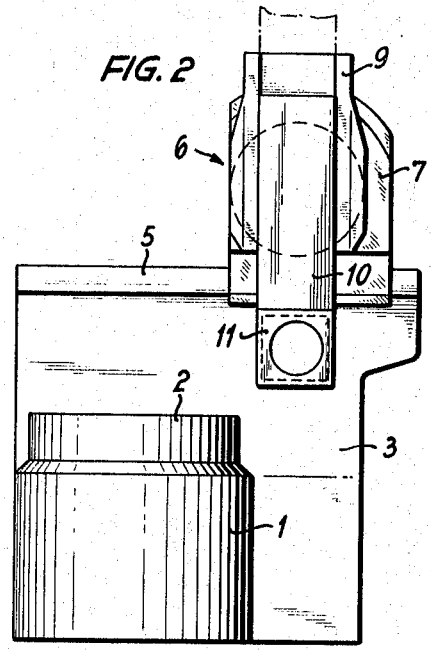
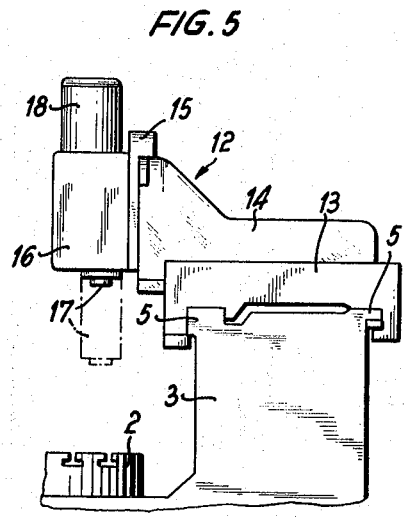
INVENTORS:
F. Böttger and P. Cüppers
BY
Richards & Geier
ATTORNEYS INVENTORS:
F. Böttger and P. Cüppers
BY
Richards & Geier
ATTORNEYS 3,307,438
MACHINE TOOL
Friedrich Böttger, Rheydt, and Paul Cüppers, Solingen-Wald, Germany, assignors to Maschinenfabrik Froriep G.m.b.H., Rheydt, Germany, a corporation of Germany
Filed Feb. 17, 1965, Ser. No. 433,372
Claims priority, application Germany, Feb. 21, 1964, M 60,009
6 Claims. (Cl. 82—2)

This invention relates to a machine tool having a face plate rotatable about a vertical axis or a similar work holder and also having transverse guides for one or more tool carrying slide units, tool holders or the like; the invention refers more particularly to a single column revolving lathe.

In prior art machines of this type the transverse guides for the tool-carrying slide units were constituted by a transverse beam which was usually adjustable in the vertical direction sliding upon one or two supports. The guides for the slides were always mounted substantially in one vertical plane, i.e. they were located one above the other.

It was found that this conventional construction of a revolving lathe has drawbacks in several respects and furthermore, prevents the attachment of requirements brought about by the modern technique. Thus the conventional arrangement of a transverse beam produces substantial difficulties for the precise manufacture and the maintenance of the accuracy in use of the guide ways of these machines. Special measures are usually necessary, for example, the flat slide guides must be machined in accordance with special workshop experience, so as to provide a good straight guiding of the tool holders under load during operation. This is a necessity even in the case of smaller units. Moreover, there is hardly any possibility of choice as far as the type and the construction of the guides are concerned; on the contrary, it is possible to use only the slide guide of only one well known type.

As already stated, the usual cross beam arrangement is not satisfactory any more in many cases for different reasons. Machine tools are now required to an ever increasing extent to carry out operations which are foreign to the basic design of the machine and which must be carried out by additional devices of quite different types. In the case of revolving lathes they include, for example, the making of bore holes and threads the center of which is offset from the center of the face plate, the grinding of inner and outer diameters, as well as face milling, honing and fine draw grinding. In many instances the special devices required for these purposes can be installed only with difficulty, or not at all, since when installing them space difficulties are encountered, particularly in the case of smaller units, which are caused by the present construction of the machine.

An object of the present invention is to remedy these defects, to overcome the observed drawbacks of prior art constructions and to provide a machine of a novel form of construction which will have several operational advantages that could not be attained heretofore.

Other objects of the present invention will become apparent in the course of the following specification.

In the accomplishment of the objectives of the present invention it was found desirable to provide a machine of the above-described type wherein the transverse guides for one or more tool-carrying slide units are located substantially in a horizontal plane, i.e. not one above the other, but side by side. This eliminates the above-described difficulties concerning the precision of manufacture and operation, which existed in the prior art suspended arrangement of the transverse beams. Furthermore, this construction provides a more favorable engagement of forces at the guide way and, in addition, it makes possible the use of up-to-date guide way constructions the incorporation of which was not possible heretofore, such as roller guides of different types and hydrostatic guides.

A further advantage of the construction of the present invention consists in a substantially smaller height of the machine, combined with a saving in weight and better facilities for treating large parts. This construction makes economically possible the casting of underframe and column as a single casting. Furthermore, it is of advantage that the tool holder itself can be made much more compact and more rugged than heretofore and that its rearward portion may provide room for driving and switching elements, so that the feed and directional connections do not have to be guided any more to the holder from a special feed box through long torsionally soft shaft drives.

Finally, in accordance with the present invention the bulkiness of the entire machine is considerably reduced in an exceptionally advantageous manner. This is of fundamental importance, firstly, for the accessibility and, secondly, for the possibility of carrying out very different machining steps with additional or auxiliary devices. By way of example, the machine can be constructed without difficulties in such manner that the front edges of the holder guide are spaced from the center of rotation at a distance which corresponds to the largest rotational radius. A construction of this type provides in a manner not known heretofore free vertical accessibility of the face plate for the exchange of tools and for the hoisting gear. The advantageous space conditions which are thus available make it possible to provide slide units or corresponding additional devices, by means of which it is also possible to comply with special requirements concerning the type of operation and the adjustment of the tool.

In accordance with the present invention the parts used for transverse guiding can be firmly connected with the machine frame or the columns; this provides a robust and rigid construction.

Furthermore, in accordance with the present invention horizontal transverse guides for one or more slide units are provided in a part of the machine which is vertically adjustable. More particularly, horizontal slide guides can be mounted upon the top and/or the underside of a transverse beam which is adjustable vertically.

There are several possibilities as far as the construction of the slide units is concerned. In accordance with a further feature of the present invention, at least one slide unit movable along the transverse guides is provided with a part which, in addition to this possibility of movement, is also adjustable in a horizontal plane. This makes it possible to provide in individual constructions an additionally adjustable part which can be shifted along a straight line, for example, as a slide or also as a spindle sleeve; or the additionally adjustable part can be made to swing or rotate in a horizontal plane.

According to a further feaure of the present invention at least one slide unit movable along the transverse guides, has a part adjustable in a vertical plane. A particularly advantageous construction consists in that the part adjustable in a vertical plane is mounted upon another part which itself is additionally adjustable in a horizontal plane relatively to the transverse guide movement. In each instance, individual constructions may again be such that the part adjustable in the vertical plane is movable along a straight line, whether it be the slide, the spindle sleeve or some other suitable element, or whether it be a swingably or rotatably mounted part.

The plane in which the adjustable part is swingable or rotatable, can extend parallel to the direction of the transverse guiding in a manner known per se. In some cases however, it is advantageous to arrange the swinging plane of the adjustable part so that it extends at an angle to the direction of the transverse guides, whereby this angle can be a right angle or some other angle.

The basic design of the machine in accordance with the present invention in its simplest embodiment includes, by way of example, a tool holder which is adjustable along transverse guides, such as a turret head used for turning; then the machine corresponds to a normal revolving lathe as far as its operational range and output possibilities are concerned, i.e. the machine provides everything which is provided by a machine of conventional construction with a transverse beam guided upon a support. However, the machine of the present invention differs advantageously from prior art machines by its simpler and more rugged construction and by its substantially greater working precision.

Instead of the usual rotary holder, or particularly, in addition thereto, one or more additional slide units can be provided in a very advantageous manner without any difficulties, by the use of which special or additional working operations can be carried out, which up to now could not be accomplished upon such a machine or could be accomplished only with great difficulties. In addition, the present invention also provides the possibility for enlarging the structure of the machine corresponding to prevailing requirements or depending upon more complicated and more widely different tasks which in time may be required of it. For this purpose the present invention provides an extension piece connected with the machine frame or the support and used to extend the transverse guides provided in the basic construction of the machine to a predetermined extent. The size of this extension piece is such that it can receive at least one slide unit. This slide unit can be advantageously provided with devices for additional machining operations. More particularly, it can be used to provide the above described additional adjustability in the direction toward the face plate. These and other previously described embodiments have been made possible only by the provision of horizontal transverse guides in accordance with the present invention. Heretofore this was impossible since the required space, particularly rearwardly, was occupied by transverse beams and one or more columns.

The additional possibility of adjustment in the direction toward the axis of rotation, provides such an increase in operational possibilities, that a tool holder equipped in this manner can be used for substantially all existing additional operations in a universal manner. Apart from drilling and milling operations for producing passage holes and threaded holes, grooves, slots, all types of chamferings, eyes for connection with transverse bore holes and oblique bore holes by the use of rotary means, it is possible to provide various other operations, such as the round milling of complicated profiles, oval or copy milling with masters or with the aid of kinematic connections, thread milling and flat copy milling. A drilling or milling spindle in vertical or inclinde positions can be used for these operations.

In accordance with a further feature of the present invention at least one slide unit provided for these operations includes a feed drive in one or several directions which is independent of the rotation of the face plane.

Furthermore, according to the present invention one or more slide units comprise an angle drilling head, an angle milling head or the like, or are equipped for the mounting of these heads. This also makes it possible to produce bore holes and undercut milled surfaces perpendicularly or in any other direction relatively to the axis of rotation. As already stated, the vertical adjusting or feed movement of such a head can be effected by means of a spindle sleeve or the shifting of a slide between the unit and the swingable part.

It is advantageous or even necessary to provide a face plate which is capable of rotating sufficiently slowly depending upon the type of work to be carried out, whereby this rotation should be suitable to provide the milling feed; furthermore, the face plate should be provided with an angle measuring or angle dividing device of corresponding precision, so as to be able, for example, to adapt a predetermined working range of a drilling spindle to different parts of a workpiece surface by the rotation of the face plate.

Furthermore, it is possible to equip a slide unit, particularly one which is provided for supplementary machining, with a grinding device for working on inner and outer diameters or on flat surfaces, or to provide it with a slotting tool for producing grooves and perforations of all different types, or with devices for the finishing of bore holes. The present invention makes it posible to so construct the machine that all such devices and accessories may be fitted thereto whenever necessary. The invention makes it posible to provide tool holders in a simple manner with special drives or switching means of all different types or to adapt the machine in different stages to an automatic operational cycle. This may include, for example, the provision of arresting rotary devices, of cam ledges for cam-actuated operation of all moving devices and for measuring systems for numerical distance measuring devices or numerical control devices of all different types.

The invention will appear more clearly from the following detailed decription when taken in connection with the accompanying drawings showing by way of example only, preferred embodiments of the inventive idea.

In the drawings:

FIGURE 1 shows in side view a machine constructed in accordance with the principles of the present invention.

FIGURE 2 is a front view of the machine shown in FIG. 1.

FIGURE 5 is a fragmentary side view of the machine of FIGS. 3 and 4.

Figure 3:
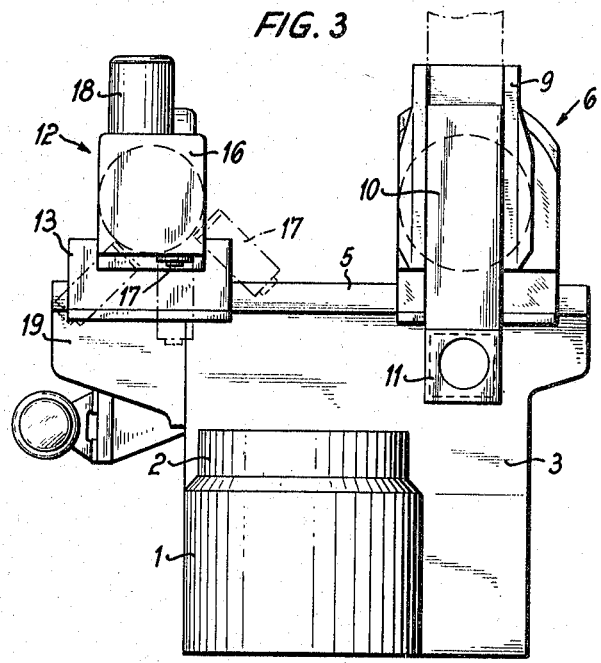
FIGURE 3 is a front view of a somewhat different embodiment of the machine according to the present invention.

FIGS. 1 and 2 show a single column revolving lathe having an underframe 1 with a face plate 2 mounted thereon, as well as a support or column 3. The support 3 is firmly connected with the underframe 1, or the support 3 and the underframe 1 may be a single casting; this is economically feasible in accordance with the present invention. The rear of the support 3 has a switch cabinet 4 for the electrical equipment.

In accordance with the present invention, transverse guides or cross ways 5 for a slide unit or turret 6 which serves as a rotary tool holder, are located side by side, with the result that all the previously described advantages can be attained. In the illustrated embodiment the transverse guides are located directly upon the column 3.

The slide unit 6 has a portion 7 which slides upon the transverse guides 5 and which provides space for the accommodation of driving and switching means, particularly for a feed drive. The slide portion 7 is connected in a manner known per se with a holder 9 rotatable about a horizontal axle 8 and supporting a linearly adjustable carriage 10. The carriage 10 is provided with a tool holder 11 adapted for the chucking of turning cutters or the like. An upper position of the carriage 10 is shown by broken lines.

The carriage 10 can be replaced, for example, by an octagonal ram or the like; thus all the facilities of prior art revolving lathes are still made available.

This machine of the present invention is characterized by its simple and rugged construction, low height and simplified and precise working facilities, as well as reliable and precise operation over long time periods.

The operation of this machine is apparent from the above description.

Figure 4:
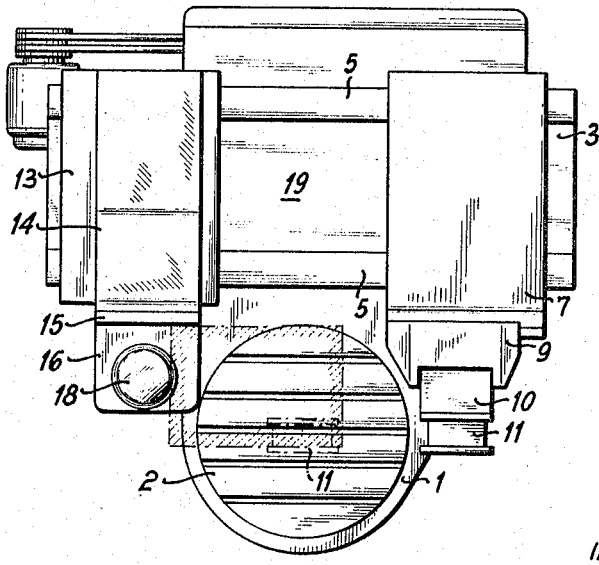
FIGURE 4 is a plan view of the machine shown in FIG. 3.

FIGS. 3 to 5 show a different construction of the machine of the present invention which embodies particularly effectively the further advantage of the invention residing in good accessibility to the face plate carrying the work piece and in the availablility of sufficient free space for carrying out additional machining operations.

The machine shown in FIGS. 3 to 5 includes several parts which are the same as those shown in FIGS. 1 and 2, namely, an underframe 1 with a face plate 2 and a support 3 with horizontally disposed transverse guides 5. A slide unit 6 having a tool carying carriage 10 is mounted on the guides 5. The slide unit 6 serves essentially as a rotary tool head, while a further slide unit 12 is provided for additional or special machining operations, which can be constructed to suit the specific requirements. For example, the slide unit 6 may carry a turning tool, while the slide unit 12 may carry a tool for auxiliary operations, such as grinding, milling, slotting or the like.

In the illustrated construction which is shown by way of example only, a saddle 13 which can be shifted along the transverse guides 5, carries a slide 14 which is movable horizontally transversely thereto and which carries a rotary holder 15 swingable about a horizontal axle.

The swinging plane of the holder 15 instead of being parallel to the transverse guides 5, can extend at a right angle thereto, or at another angle, if this is advantageous or necessary for carrying out a specific operation.

The rotary holder 15 carries a casing 16 for a work spindle 17 which is driven by a motor 18 and has an adjustable spindle sleeve. FIGURES 3 and 5 show by broken lines a possible extended position of the spindle 17; in addition, FIG. 3 illustrates a few inclined positions of the spindle produced by turning the rotary holder. In addition to these facilities, the upper slide 14 provides an adjustability in the direction toward the face plate and away from the face plate. Thus the spindle axle and, consequently, the fitted tool can exceed an operational region, for example, that indicated by shaded broken lines in FIG. 4. By properly turning the face plate 2 each part of the fixed workpiece can be brought within this range. Preferably the face plate is provided with angle measuring or angle dividing means; then, for example, a drilling tool mounted in the work spindle 17 can be used to drill precise bore holes in the required locations.

The work spindle can be also used for milling operations. The milling feed can be carried out by the face plate and for this purpose the drive of the face plate is provided with one or preferably several sufficiently slow rotary speeds.

However, the feed movement of at least one slide unit in one or several directions can be carried out by separate driving means which are independent from the means driving the face plate.

A slide unit of the type shown in the drawings or of a similar type, instead of being provided with drilling or milling tools, or in addition to such tools, can be also equipped with grinding tools or other tools for fine finishing; for example, a slotting device etc. can be also provided. The use of an angular turret head is also possible.

A machine with two tool holders should be so constructed that the transverse guides are sufficiently long to carry the two holders without one interfering with the other.

Another possibility which is shown in the drawings, consists in that a machine which was basically constructed to operate with a single tool holder, is widened by extending the transverse guides 5 through the use of an extension piece. As illustrated in FIGS. 3 to 5, an extension piece 19 is fixed to one side of the support; the piece 19 has guides constituting a continuation of the transverse guides 5 and permitting the accommodation of the second slide unit 12. The length of the guides upon the extension piece 19 should be at least equal to that of a slide unit. When not in use, the piece 19 can be moved out of the way completely.

It is apparent that the examples described above have been given solely by way of illustration and not by way of limitation and that they are subject to many variations and modifications within the scope of the present invention. All such variations and modifications are to be included within the scope of the present invention.

What is claimed is:

1. A machine tool comprising an underframe, a column connected to one side of said underframe and extending higher than said underframe, whereby said underframe and said column form an L-shaped structure, a face plate mounted upon said underframe, spaced horizontally disposed guides upon said column, whereby said guides are located to one side of and above said face plate, means carried by said guides and movable horizontally thereon relatively to said face plate, and a tool holder carried by said means for rotation about a horizontal axis, wherein said means comprise a saddle having guides extending horizontally and transversely to the first-mentioned guides, and a casing movable upon said transverse guides and carrying said holder.

2. A machine tool in accordance with claim 1, wherein the axis of the rotary movement of said holder extends at an angle to the direction of said transverse guides.

3. A machine tool comprising an underframe, a column connected to one side of said underframe and extending higher than said underframe, whereby said underframe and said column form an L-shaped structure, a face plate mounted upon said underframe, spaced horizontally disposed guides upon said column, whereby said guides are located to one side of and above said face plate, means carried by said guides and movable horizontally thereon relatively to said face plate, and a tool holder carried by said means for rotation about a horizontal axis wherein said means comprise a slide and a saddle having guides extending horizontally and transversely to the first-mentioned guides, and a casing movable upon said transverse guides, said slide and said casing carrying separate tool holders and constituting two separate slide units.

4. A machine tool in accordance with claim 3, a turning tool carried by one of said slide units and a tool for auxiliary operations carried by the other one of said slide units.

5. A machine tool in accordance with claim 4, comprising separate driving means for the feed movement of at least one of said slide units, said driving means being independent of said rotary face plate.

6. A machine tool in accordance with claim 4, wherein at least one of slide units comprises means for receiving additional tool heads.

References Cited by the Examiner

UNITED STATES PATENTS

| 1,000,764 | 8/1911 | Webendorfer | 77—26 |
|---|---|---|---|
| 1,333,043 | 3/1920 | Steinle et al. | 82—32 |
| 2,422,095 | 6/1947 | Haller et al. | |
| 2,682,697 | 7/1954 | Daugherty et al. | |
| 2,699,695 | 1/1955 | Addison | 77—4 |
| 2,791,144 | 5/1957 | Berthiez. | |

FOREIGN PATENTS

| 597,008 | 1/1948 | Great Britain. |
|---|---|---|
| 1,162,396 | 4/1958 | France. |
| 350,527 | 1/1961 | Switzerland. |

WILLIAM W. DYER, Jr., *Primary Examiner.*

LEONIDAS VLACHOS, *Examiner.*